United States Patent
Gill

(10) Patent No.: US 6,570,745 B1
(45) Date of Patent: May 27, 2003

(54) LEAD OVERLAID TYPE OF SENSOR WITH SENSOR PASSIVE REGIONS PINNED

(75) Inventor: Hardayal Singh Gill, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 09/718,309

(22) Filed: Nov. 20, 2000

(51) Int. Cl.$^7$ .................................................. G11B 5/39
(52) U.S. Cl. .................................. 360/324.12; 360/322
(58) Field of Search ............................. 360/322, 324.12

(56) References Cited

U.S. PATENT DOCUMENTS

| | | | |
|---|---|---|---|
| 4,914,538 A | 4/1990 | Howard et al. | 360/113 |
| 5,005,096 A | 4/1991 | Krounbi et al. | 360/113 |
| 5,313,186 A | 5/1994 | Schuhl et al. | 338/32 |
| 5,341,261 A | 8/1994 | Dieny et al. | 360/113 |
| 5,408,377 A | 4/1995 | Gurney et al. | 360/113 |
| 5,442,508 A | 8/1995 | Smith | 360/113 |
| 5,461,526 A | 10/1995 | Hamakawa et al. | 360/113 |
| 5,461,527 A | 10/1995 | Akiyama et al. | 360/113 |
| 5,491,600 A | 2/1996 | Chen et al. | 360/113 |
| 5,528,440 A | 6/1996 | Fontana et al. | 360/113 |
| 5,581,427 A | 12/1996 | Feng et al. | 360/113 |
| 5,583,725 A | 12/1996 | Coffey et al. | 360/113 |
| 5,608,593 A * | 3/1997 | Kim | 360/324.12 |
| 5,627,703 A | 5/1997 | Smith | 360/113 |
| 5,650,887 A | 7/1997 | Dovek et al. | 360/75 |
| 5,684,658 A | 11/1997 | Shi et al. | 360/113 |
| 5,701,222 A | 12/1997 | Gill et al. | 360/113 |
| 5,705,973 A | 1/1998 | Yuan et al. | 338/32 |
| 5,708,358 A | 1/1998 | Ravipati | 324/252 |
| 5,717,550 A | 2/1998 | Nepela et al. | 360/113 |
| 5,739,987 A | 4/1998 | Yuan et al. | 360/113 |
| 5,742,459 A | 4/1998 | Shen et al. | 360/113 |
| 5,764,445 A | 6/1998 | Torng et al. | 360/113 |
| 5,793,207 A | 8/1998 | Gill | 324/252 |
| 5,856,897 A | 1/1999 | Mauri | 360/113 |
| 5,883,764 A | 3/1999 | Pinarbasi | 360/113 |
| 5,905,611 A | 5/1999 | Yoda et al. | 360/113 |
| 5,910,344 A | 6/1999 | Hasegawa et al. | 427/599 |
| 5,923,503 A | 7/1999 | Sato et al. | 360/113 |
| 5,923,505 A | 7/1999 | Kroes et al. | 360/113 |
| 5,949,623 A | 9/1999 | Lin | 360/113 |

(List continued on next page.)

FOREIGN PATENT DOCUMENTS

| | | |
|---|---|---|
| EP | 0 552 890 A2 | 1/1993 |
| EP | 0 590 905 A2 | 9/1993 |
| JP | 406103533 A | 4/1994 |
| JP | 407210828 A | 8/1995 |
| JP | 407272220 A | 10/1995 |
| JP | 08249617 A | 9/1996 |
| JP | 408287426 A | 11/1996 |
| JP | 408293107 A | 11/1996 |
| JP | 410222817 A | 8/1998 |
| JP | 410312514 A | 11/1998 |
| JP | 410341048 A | 12/1998 |

OTHER PUBLICATIONS

IBM Technical Disclosure Bulletin, "Continuous Spacer Spin Valve Structure," vol. 39, No. 4, Apr. 1996.
IEEE Transactions on Magnetics, vol. 35, No. 5, Sep. 1999, "Thermal Management Design for GMR Head ESD–Robustness".

*Primary Examiner*—A. J. Heinz
(74) *Attorney, Agent, or Firm*—Robert O. Guillot; Intellectual Property Law Office

(57) ABSTRACT

An improved magnetic head for a hard disk drive including a lead overlaid read head component in which the magnetic fields of the passive region of the free magnetic layer regions are pinned. In one embodiment a thin film layer composed of a magnetic material is deposited on top of the free layer of the GMR head in the passive region beneath the overlaid electrical leads. In an alternative embodiment the passive region of the free layer is anti-parallel coupled.

16 Claims, 3 Drawing Sheets

U.S. PATENT DOCUMENTS

| | | | |
|---|---|---|---|
| 5,974,657 A | 11/1999 | Fox et al. | 29/603.08 |
| 5,978,182 A | 11/1999 | Kanai et al. | 360/113 |
| 5,989,690 A | 11/1999 | Fujikata et al. | 428/212 |
| 6,002,553 A | 12/1999 | Stearns et al. | 360/113 |
| 6,122,151 A * | 9/2000 | Saito | 360/324.12 |
| 6,198,378 B1 * | 3/2001 | Saito | 360/324.12 |

* cited by examiner

LEAD OVERLAID TYPE OF SENSOR WITH SENSOR PASSIVE REGIONS PINNED

BACKGROUND OF THE INVENTION

1. Field of the Invention

The present invention relates generally to read head portions of magnetic heads for hard disk drives, and more particularly to lead overlaid read heads having magnetically pinned passive regions.

2. Description of the Prior Art

One well known way to increase the performance of hard disk drives is to increase the areal data storage density of the magnetic hard disk. This can be accomplished by reducing the written data track width, such that more tracks per inch can be written on the disk. To read data from a disk with a reduced track width, it is also necessary to develop sufficiently narrow read head components, such that unwanted magnetic field interference from adjacent data tracks is substantially eliminated.

The standard prior art read head elements include a plurality of thin film layers that are deposited and fabricated to produce a GMR read head, as is known to those skilled in the art. Significantly, where the width of the thin film layers that comprise the GMR read head is reduced below certain values, the magnetic properties of the layers are substantially compromised. To overcome this problem, GMR read heads have been developed in which the thin film layers have an ample width and the electrical leads are overlaid on top of portions of the thin film layers. This lead overlaid configuration has the effect of creating an active read head region having a width that is less than the entire width of the deposited layers, such that the magnetic properties of the thin film layers can be preserved. Thus, in the lead overlaid GMR read heads of the prior art, active magnetic layer portions exist between the electrical leads and passive magnetic layer portions exist beneath the electrical leads.

A problem that has been recognized with regard to such prior art lead overlaid read heads is that the passive region of the magnetic layers of the read head, and particularly the free magnetic layer, is not entirely passive. That is, external magnetic fields, such as from adjacent data tracks, create magnetic field fluctuation and noise within the passive regions of the free magnetic layer beneath the electrical leads. Thus, noise and side reading effects continue to be a problem with lead overlaid GMR read heads. The present invention seeks to solve this problem by pinning the magnetization of the free magnetic layer in the passive regions beneath the overlaid electrical leads, thus stabilizing the passive regions, and reducing noise and side reading effects.

SUMMARY OF THE INVENTION

The present invention is an improved magnetic head for a hard disk drive including a lead overlaid read head component in which the magnetic fields of the passive region of the free magnetic layer regions are pinned. In one embodiment of the present invention an additional thin film layer composed of a magnetic material such as the hard bias layer material is deposited on top of the free layer of the GMR head in the passive region beneath the overlaid electrical leads. When the hard bias layer is magnetically initialized, magnetic fields created in the new thin film layer act to pin the magnetic fields in the passive regions of the free layer. The operational characteristics of the read head are improved because the passive region of the free layer is magnetically pinned and thus not affected by side reading magnetic fields from adjacent data tracks. Noise and side reading effects are thereby reduced and the performance of the read head is thereby improved. In alternative embodiments of the present invention the passive region of the free layer is anti-parallel coupled through the deposition of a thin film ruthenium layer followed by a thin film magnetic layer on top of the passive region of the free layer. The anti-parallel coupled magnetic field within the passive region of the free layer is thereby rendered less sensitive to side reading and noise, such that an improved magnetic head is thereby produced.

It is an advantage of the magnetic head of the present invention that a lead overlaid read head has been developed with reduced noise and side reading problems.

It is another advantage of the magnetic head of the present invention that a lead overlaid read head has been developed having pinned magnetic fields in the passive region of the free magnetic layer thereof.

It is an advantage of the hard disk drive of the present invention that it includes a magnetic head having a reduced read track width with reduced side reading and noise.

It is another advantage of the hard disk drive of the present invention that it includes a magnetic head having a lead overlaid read head having pinned magnetic fields in the passive region of the free magnetic layer thereof.

These and other features and advantages of the present invention will no doubt become apparent to those skilled in the art upon reading the following detailed description with makes reference to the several figures of the drawings.

IN THE DRAWINGS

DETAILED DESCRIPTION OF THE PREFERRED EMBODIMENTS

Figure 1:
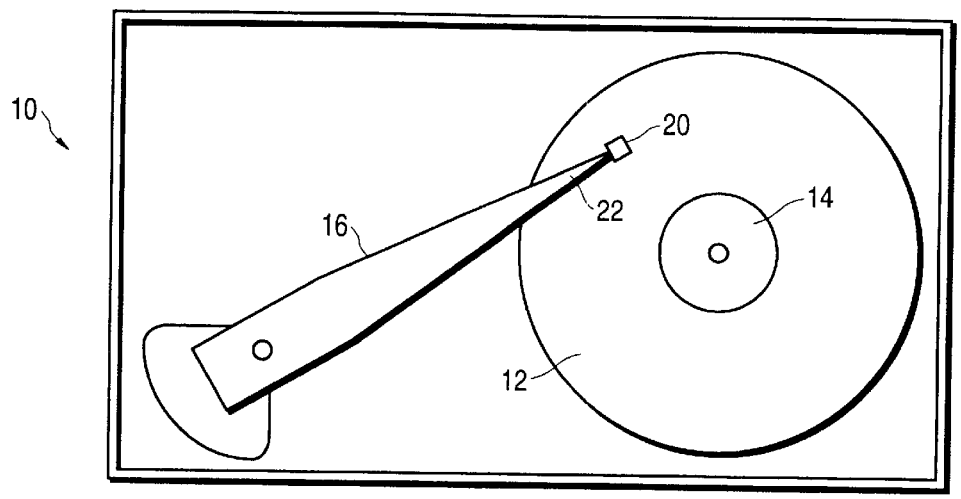
FIG. 1 is a top plan view depicting a hard disk drive having a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

One way to increase the areal data storage density of a hard disk 12 is to narrow the track width of the data tracks written on the hard disk, such that more tracks per inch can be written on the disk. To write data in narrower tracks it is first necessary to develop the write head components of magnetic heads with a narrower written track width. Correspondingly, it is also necessary to develop read head components of such magnetic heads 20 having narrowed active read head widths, such that side reading from adjacent data tracks is minimized. However, as is known in the prior art, and described in detail herebelow, performance limitations exist with regard to the width of the thin film layers that form the read head active components of GMR read heads. That is, the desirable magnetic properties of the thin film layers of the read head are adversely affected where the width of the read head layers is decreased below certain values. A prior art attempt to overcome this limitation is the electrical lead overlaid read head configuration that is depicted in FIG. 2, and next described.

Figure 2:
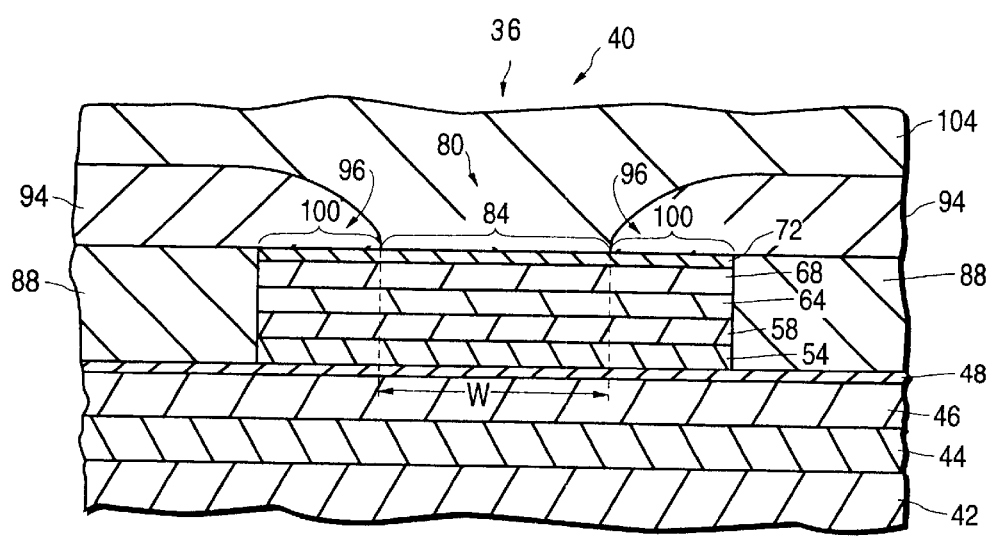
FIG. 2 is a side cross-sectional view of a prior art lead overlaid read head portion of a magnetic head.

FIG. 2 is a side cross-sectional view of a prior art electrical lead overlaid read head 36 portion of a magnetic head 40. As depicted therein, the prior art lead overlaid read head 36 generally includes a substrate base 42 that constitutes the material from which the magnetic head is fabricated, such as aluminum titanium carbide. A first magnetic shield 44 is fabricated on the substrate, and an insulation layer 46, typically composed of aluminum oxide, is fabricated upon the magnetic shield 44. A seed layer 48 is deposited upon the insulation layer 46 and a series of thin film layers are sequentially deposited upon the seed layer 48 to form a GMR read head. A variety of thin film layers are known in the prior art to fabricate such GMR read heads, and, for the purposes of the present invention the layers generally include an antiferromagnetic layer 54, a pinned magnetic layer 58 that is deposited upon the antiferromagnetic layer 54, a spacer layer 64 that is deposited upon the pinned magnetic layer 58, a free magnetic layer 68 that is deposited upon the spacer layer 54 and a cap layer 72 that is deposited upon the free magnetic layer 68. Typically, the antiferromagnetic layer 54 may be composed of PtMn, the pinned magnetic layer 58 may be composed of CoFe, the spacer layer 64 may be composed of Cu, the free magnetic layer 68 may be composed of CoFe and the cap layer 72 may be composed of Ta.

Following the deposition of the GMR read head layers 54–72, a patterned etching process is conducted such that only central regions 80 of the layers 54–72 remain. Thereafter, hard bias elements 88 are deposited on each side of the central regions 80. Following the deposition of the hard bias elements 88, electrical lead elements 94 are fabricated on top of the hard bias elements 88. As depicted in FIG. 2, inner ends 96 of the leads 94 are overlaid on top of outer portions 100 of the layers 54–72 of the central read head layer regions 80. A second insulation layer 104 is fabricated on top of the electrical leads 94 and cap layer 72, followed by the fabrication of a second magnetic shield (not shown) and further components that are well known to those skilled in the art for fabricating a complete magnetic head.

A significant feature of the prior art lead overlaid GMR read head 36 depicted in FIG. 2 is that the portion of the central layer region 80 which substantially defines the track reading width w of the read head 40 is the central portion 84 of the read head layer regions 80 that is disposed between the inner ends 96 of the electrical leads 94. That is, because the electrical current flows through the read head layers between the electrical leads 94, the active portion 84 of the read head layers comprises the width w between the inner ends 96 of the electrical leads 94. The outer portions 100 of the read head layers disposed beneath the overlaid inner ends 96 of the electrical leads 94 are somewhat passive in that electrical current between the electrical leads 94 does not pass through them. A significant problem with the prior art lead overlaid read head 40 depicted in FIG. 2 is that the magnetization in the outer portions 100 of the free layer 68 beneath the electrical leads 94 is unstable and subject to unwanted magnetic field fluctuations. Additionally, side reading effects from adjacent data tracks as well as magnetic noise is created in the passive portions 100 of the free layer 68 beneath the electrical lead ends 96. It is an object of the present invention to stabilize the magnetic field of the free layer in the passive outer areas 100 beneath the electrical leads, to reduce the magnetic noise and the side reading effects.

Figure 3:
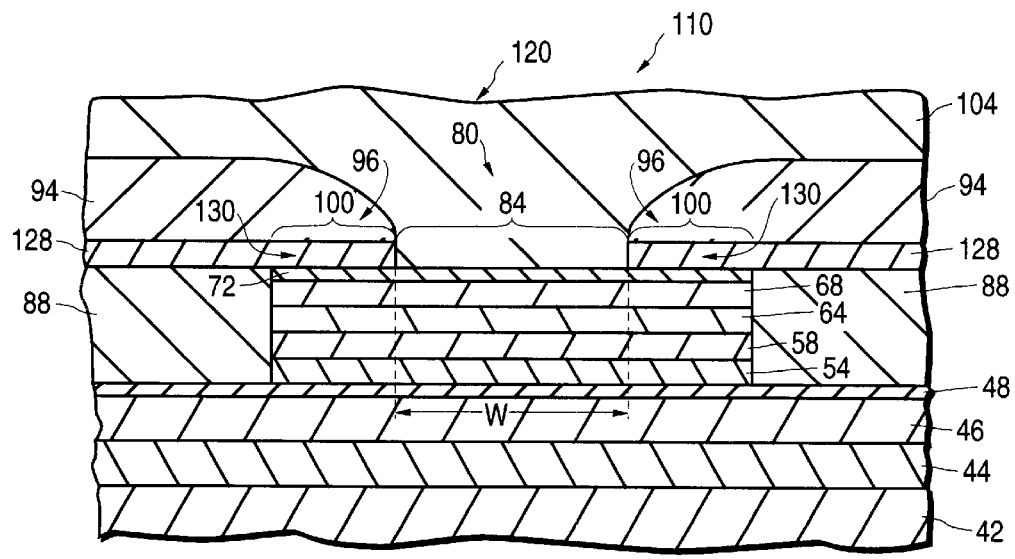
FIG. 3 is a side cross-sectional view of a first preferred embodiment of a lead overlaid read head portion of a magnetic head of the present invention.

A first preferred magnetic head 110, which is suitable for use as the magnetic head 20 of FIG. 1, having a lead overlaid read head 120 of the present invention is depicted in FIG. 3. As depicted therein, the read head 120 includes a GMR read head thin film element 80, as well as the hard bias elements 88. The significant feature of the read head 120 is the fabrication of an additional magnetic thin film layer 128 that is deposited on top of the hard bias elements 88, such that an inner portion 130 of the layer 128 extends over the outer portions 100 of the layers that comprise the read head element 80. In this preferred embodiment 120, the magnetic layer 128 is deposited on top of the outer portions 100 of the tantalum cap layer 72, and directly on top of the magnetic hard bias elements 88. The electrical leads 94 are thereafter fabricated on top of the magnetic layer 128. In a preferred fabrication method, the electrical lead mask that is utilized to fabricate the electrical leads 94 is first used to fabricate the magnetic layer 128 and then used to fabricate the electrical leads 94. In the preferred embodiment, the magnetic layer 128 is composed of the same CoPtCr material that is utilized to fabricate the hard bias elements 88, and where the hard bias elements 88 may have a thickness of approximately 200–300 Å, the magnetic layer 128 is fabricated with a thickness of approximately 50 Å, which is comparable to the thickness of the free layer 68.

As will be understood by those skilled in the art, following the magnetic field initialization of the hard bias elements 88, the magnetic field of the hard bias elements 88 will create corresponding magnetic fields within the magnetic layer 128. Furthermore, because the inner portion 130 of the magnetic layer 128 is deposited on top of the outer portion 100 of the tantalum cap layer 72, which is deposited above the outer portion 100 of the free layer 68, the magnetic field within the inner portion 130 of the magnetic layer 128 will become magnetostatically coupled to the outer portion 100 of the free layer through the tantalum cap layer 72. This provides a pinning effect upon the magnetic fields within the outer portion 100 of the free layer, because it raises the coercivity of the free layer within the outer region 100. Where the magnetization of the free layer within the outer portion 100 is pinned, the possibility of side reading is diminished and noise is reduced. Thus the magnetic head 110 provides improved characteristics over the prior art lead overlaid magnetic head 40 depicted in FIG. 2. A further improvement in the present invention is next described with the aid of FIG. 4.

Figure 4:
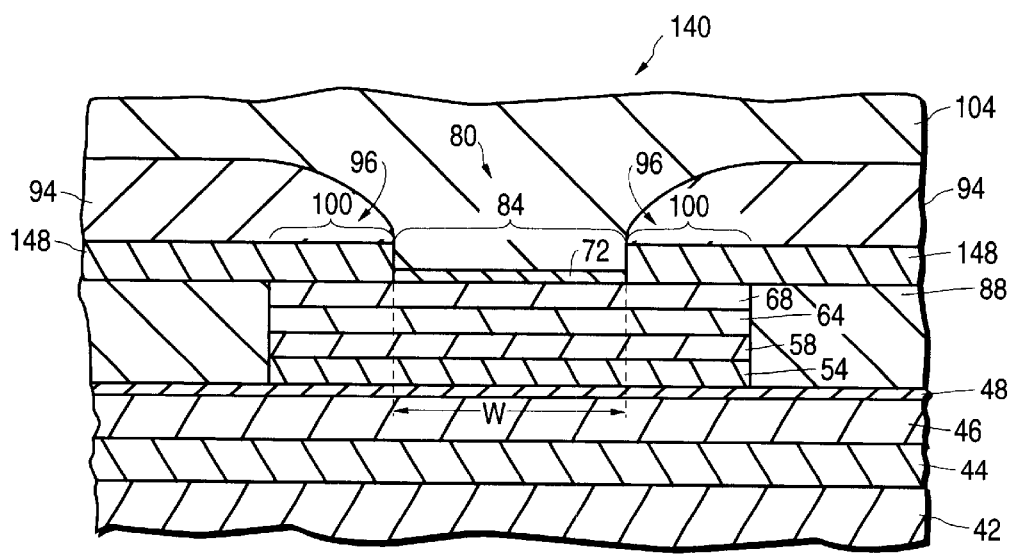
FIG. 4 is a side cross-sectional view of a second preferred embodiment of a lead overlaid read head portion of a magnetic head of the present invention.

FIG. 4 is a side cross-sectional view depicting another preferred embodiment of the present invention. As depicted therein, the magnetic head 140, which is suitable for use as the magnetic head 20 of FIG. 1, includes an improved GMR read head element 142 having a plurality of thin film layers 54–72 as described hereabove. Significantly, the tantalum cap layer 72 has been etched away in the outer areas 100 beneath the electrical lead ends 96, such that the upper surface of the free layer 68 is exposed in the passive regions 100. Thereafter, a magnetic layer 148 which is similar to the magnetic layer 128 of the magnetic head 110 is deposited. Significantly, in the magnetic head embodiment 140, the magnetic layer 148 is deposited directly on top of the passive outer end portions 100 of the free layer 68. That is, in comparison with the embodiment 110 depicted in FIG. 3, the outer portions of the tantalum cap layer 72 are not interposed between the magnetic layer 148 and the free layer 58. Thus the magnetic layer 148 is deposited directly on top of the hard bias elements 88 and on top of the outer portions 100 of the free layer 68. As will be understood by those skilled in the art, the magnetic fields within the passive outer portion 100 of the free layer 68 will be more strongly pinned by the magnetic fields within the magnetic layer 148 than they would be in the magnetic head 110 depicted in FIG. 3. The embodiment 140 depicted in FIG. 4 is therefore an improvement upon the embodiment 110 depicted in FIG. 3, in that the magnetic fields within the passive outer portion 100 of the free layer are more effectively pinned, such that noise and side reading is still further reduced. Yet another embodiment of the present invention is depicted in FIG. 5 and next described.

Figure 5:
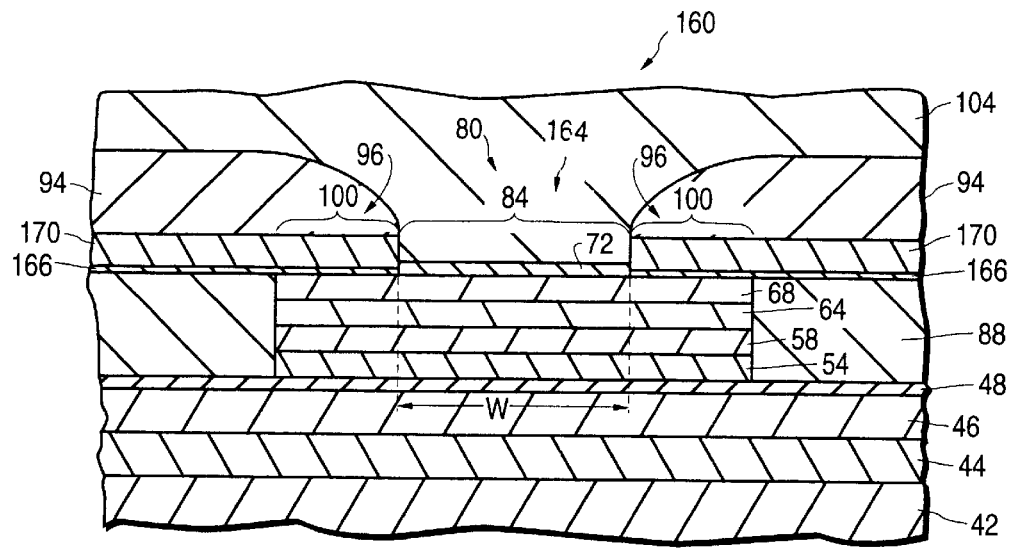
FIG. 5 is a side cross-sectional view of a third preferred embodiment of a lead overlaid read head portion of a magnetic head of the present invention.

FIG. 5 is a side cross-sectional view of a magnetic head 160 of the present invention which is also suitable for use as the magnetic head 20 of FIG. 1. As depicted therein, the magnetic head 160 includes a GMR read head element 164 having a plurality of thin film layers 54–72 as described hereabove. As with embodiment 140 depicted in FIG. 4, the outer portions of the tantalum cap layer 72 have been etched away, such that the tantalum cap layer 72 is formed in the active region of the read head 164. Following the fabrication of the hard bias elements 88 a first thin film layer 166 is deposited upon the hard bias layer as well as on the passive outer portion 100 of the free layer 68. In the preferred embodiment, the thin film layer 166 is composed of ruthenium and has a thickness of approximately 8 Å. Following the deposition of the ruthenium layer 166 a second thin film layer 170 is deposited. The layer 170 is preferably composed of a magnetic material such as NiFe with a magnetic thickness that is substantially equal to and preferably a bit less than the magnetic thickness of the free layer 68. Where the free layer has a thickness of approximately 50 Å the layer 170 may also have a thickness of approximately 50 Å. It will therefore be understood that the NiFe layer 170 is anti-parallel coupled to the passive outer portion 100 of the free layer 68 through the ruthenium layer 166. Thereafter, when the hard bias layer is magnetically initialized it sets the magnetization of the passive outer portions 100 of the free layer due to the anti-parallel coupling of the magnetic layer 170 with the free layer 68 and the ruthenium layer 166 located therebetween.

In a preferred GMR read head embodiment of the present invention, the pinned magnetic layer 58 may consist of three sublayers CoFe/Ru/CoFe, and the free magnetic layer 68 may consist of two sublayers CoFe/NiFe. As with the preceding preferred embodiments 110 and 140, the magnetic head 160 produces reduced noise and reduced side reading from the passive outer portions 100 of the free layer 68. Thus the read track width w can be effectively reduced utilizing the electrical lead overlaid concept, and the magnetic noise and side reading can be likewise reduced by anti-parallel coupling of the magnetic field in the passive outer portions 100 of the free layer beneath the electrical lead ends 96.

Figure 6:
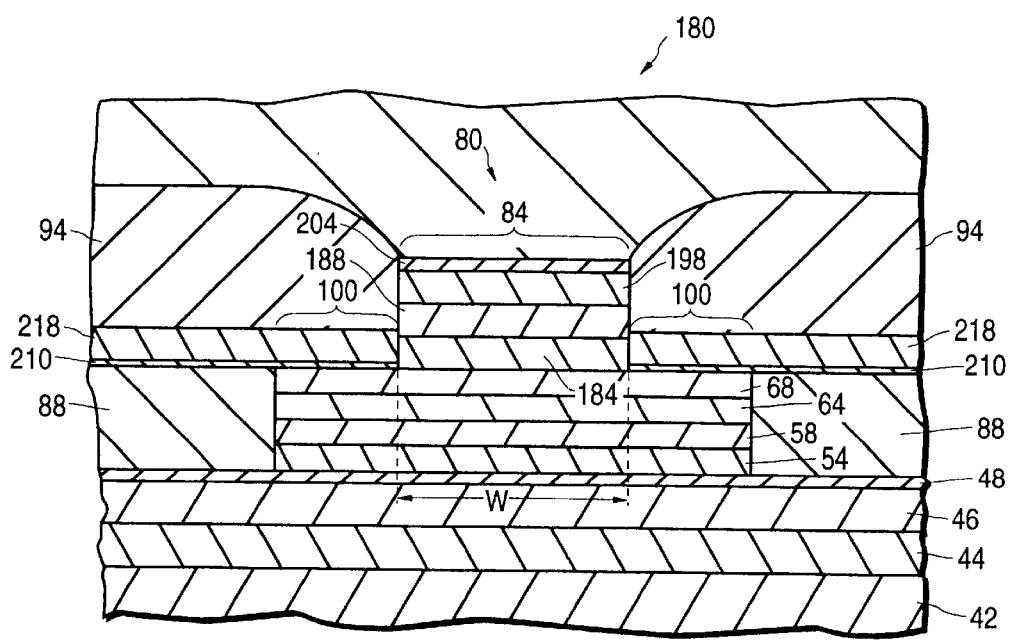
FIG. 6 is a side cross-sectional view of a fourth preferred embodiment of a lead overlaid read head portion of a magnetic head of the present invention.

FIG. 6 is yet another embodiment of a magnetic head 180 of the present invention as applied to a dual anti-parallel pinned GMR head with overlaid leads, and which is also suitable for use as a magnetic head 20 depicted in FIG. 1. As depicted therein, the dual anti-parallel pinned GMR magnetic read head 180 includes a seed layer 48 upon which a first antiferromagnetic layer 54 is formed, followed by a pinned magnetic layer 58, a spacer layer 64 and a free layer 68. These layers are fabricated in the full width of the read head element described above with regard to FIGS. 2, 3, 4 and 5. Thereafter, a further series of layers is fabricated, including a second spacer layer 184, a second pinned layer 188 and a second antiferromagnetic layer 198, followed by a tantalum cap layer 204. In the preferred embodiment, the second spacer layer 184 is composed of copper, the second pinned layer 188 is composed of CoFe and the second antiferromagnetic layer 198 is composed of PtMn. The layers 184, 188, 198 and 204 are first pattern etched with the layers 54–68 to the full width of the read head layers 80. The hard bias element layers 88 are then fabricated up to the thickness of the free layer 68. Thereafter, the upper layers 184–204 are pattern etched to the active read head element width w. Thereafter, a thin film ruthenium layer 210 is deposited upon the hard bias layer 88 and free layer 68, as was done with embodiment 160 depicted in FIG. 5 and described hereabove, and a magnetic layer 218 is deposited upon the ruthenium layer 210 which is substantially identical to the magnetic layer 170 depicted in FIG. 5 and described hereabove. Thereafter, electrical leads 94 are deposited on top of the magnetic layer 218 at least to the thickness of upper layers 184–204. As will be understood by those skilled in the art, the magnetic head 180 will possess the improved signal reading properties of dual pinned layer GMR heads. Additionally, the head 180 possesses reduced noise and side reading characteristics due to the anti-parallel coupling of the passive outer portions 100 of the free layer 68 through the ruthenium layer 210 to the magnetic layer 218.

It can now be understood that a significant feature of the present invention is the pinning of the passive outer portions 100 of the free layer 68 that are disposed beneath the overlaid electrical lead ends 96. Thus, the present invention is intended to apply to various types and configurations of GMR read heads that include various numbers and types of thin film layers to provide improved read head characteristics for lead overlaid configurations. Therefore, while the present invention has been shown and described with regard t6 certain preferred embodiments, it will be understood that those skilled in the art will no doubt develop certain alterations and modifications thereto which nevertheless include the true spirit and scope of the invention. It is therefore intended that the following claims cover all such alterations and modifications.

I claim:

1. A magnetic head having an electrical lead overlaid read head configuration, comprising:
   a free magnetic layer, including passive regions thereof that are disposed beneath overlaid portions of read head electrical leads;
   a thin film magnetic layer being disposed above said passive regions of said free magnetic layer, and between said passive regions of said free magnetic layer and said overlaid portions of said electrical leads; wherein a cap layer is disposed on top of said passive regions of said free magnetic layer, and said thin film magnetic layer is disposed on top of said cap layer; and wherein a hard bias element is fabricated at an end portion of said free magnetic layer, and wherein portions of said thin film magnetic layer are also fabricated on top of said hard bias element.

2. A magnetic head as described in claim 1 wherein said magnetic layer is composed of NiFe and has a thickness that is approximately equal to a thickness of said free magnetic layer.

3. A magnetic head as described in claim 1 wherein said read head includes a first magnetically pinned layer, a first spacer layer disposed above said first magnetically pinned layer, said free magnetic layer disposed above said first spacer layer, a second spacer layer disposed above said free magnetic layer, and a second magnetically pinned layer disposed above said second spacer layer.

4. A magnetic head having an electrical lead overlaid read head configuration, comprising:

a free magnetic layer, including passive regions thereof that are disposed beneath overlaid portions of read head electrical leads;

a thin film magnetic layer being disposed above said passive regions of said free magnetic layer, and between said passive regions of said free magnetic layer and said overlaid portions of said electrical leads; wherein said thin film magnetic layer is disposed on top of said passive regions of said free magnetic layer; and wherein a hard bias element is fabricated at an end portion of said free magnetic layer, and wherein portions of said thin film magnetic layer are also fabricated on top of said hard bias element.

5. A magnetic head as described in claim 4 wherein a ruthenium layer is fabricated between said hard bias element and said thin film magnetic layer.

6. A magnetic head as described in claim 5 wherein said magnetic layer is composed of NiFe and has a thickness that is approximately equal to a thickness of said free magnetic layer.

7. A magnetic head as described in claim 5 wherein said read head includes a first magnetically pinned layer, a first spacer layer disposed above said first magnetically pinned layer, said free magnetic layer disposed above said first spacer layer, a second spacer layer disposed above said free magnetic layer, and a second magnetically pinned layer disposed above said second spacer layer.

8. A magnetic head as described in claim 6 wherein said magnetic layer is composed of NiFe and has a thickness that is approximately equal to a thickness of said free magnetic layer.

9. A hard disk drive including a magnetic head having a lead overlaid read head configuration, comprising:

a free magnetic layer, including passive regions thereof that are disposed beneath overlaid portions of read head electrical leads;

a thin film magnetic layer being disposed above said passive regions of said free magnetic layer, and between said passive regions of said free magnetic layer and said overlaid portions of said electrical leads; wherein a cap layer is disposed on top of said passive regions of said free magnetic layer, and said thin film magnetic layer is disposed on top of said cap layer; and wherein a hard bias element is fabricated at an end portion of said free magnetic layer, and wherein portions of said thin film magnetic layer are also fabricated on top of said hard bias element.

10. A hard disk drive as described in claim 9 wherein said magnetic layer is composed of NiFe and has a thickness that is approximately equal to a thickness of said free magnetic layer.

11. A hard disk drive as described in claim 9 wherein said read head includes a first magnetically pinned layer, a first spacer layer disposed above said first magnetically pinned layer, said free magnetic layer disposed above said first spacer layer, a second spacer layer disposed above said free magnetic layer, and a second magnetically pinned layer disposed above said second spacer layer.

12. A hard disk drive including a magnetic head having a lead overlaid read head configuration, comprising:

a free magnetic layer, including passive regions thereof that are disposed beneath overlaid portions of read head electrical leads;

a thin film magnetic layer being disposed above said passive regions of said free magnetic layer, and between said passive regions of said free magnetic layer and said overlaid portions of said electrical lead; wherein said thin film magnetic layer is disposed on top of said passive regions of said free magnetic layer; and wherein a hard bias element is fabricated at an end portion of said free magnetic layer, and wherein portions of said thin film magnetic layer are also fabricated on top of said hard bias element.

13. A hard disk drive as described in claim 12 wherein a ruthenium layer is fabricated between said hard bias element and said thin film magnetic layer.

14. A hard disk drive as described in claim 13 wherein said magnetic layer is composed of NiFe and has a thickness that is approximately equal to a thickness of said free magnetic layer.

15. A hard disk drive as described in claim 13 wherein said read head includes a first magnetically pinned layer, a first spacer layer disposed above said first magnetically pinned layer, said free magnetic layer disposed above said first spacer layer, a second spacer layer disposed above said free magnetic layer, and a second magnetically pinned layer disposed above said second spacer layer.

16. A hard disk drive as described in claim 12 wherein said magnetic layer is composed of NiFe and has a thickness that is approximately equal to a thickness of said free magnetic layer.

* * * * *